Figures 3, 4:
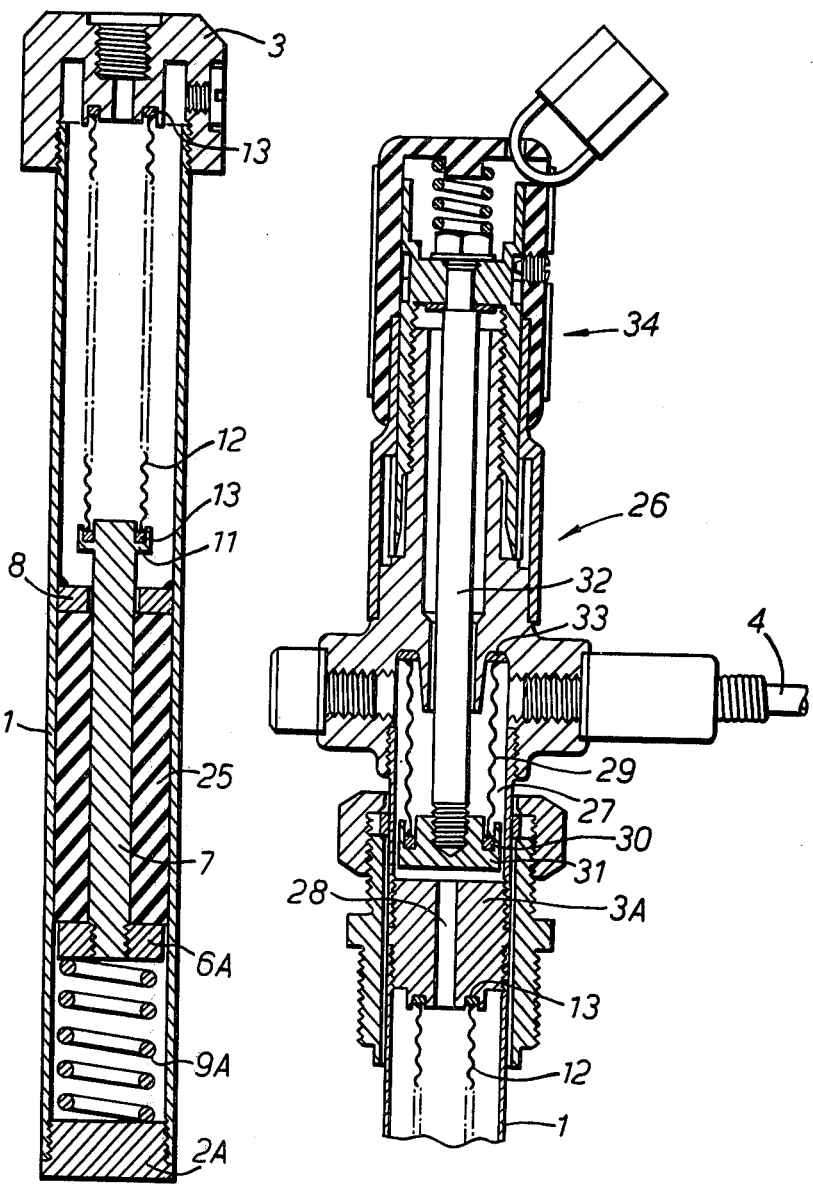

United States Patent [19]

Golch

[11] 4,161,882
[45] Jul. 24, 1979

[54] TEMPERATURE-DEPENDENT ACTUATING MECHANISMS

[75] Inventor: Peter R. B. Golch, Gloucester, England

[73] Assignee: Spirax Sarco Limited, England

[21] Appl. No.: 896,053

[22] Filed: Apr. 13, 1978

[30] Foreign Application Priority Data

Apr. 18, 1977 [GB] United Kingdom ............... 16071/77

[51] Int. Cl.² .......................... G01K 5/42; G01K 5/44
[52] U.S. Cl. ..................................... 73/368.3; 60/530; 73/368.7
[58] Field of Search ...................... 73/363, 368, 368.3, 73/368.7; 60/527, 530

[56] References Cited

U.S. PATENT DOCUMENTS

| 1,830,632 | 11/1931 | Backstrom | 73/368.3 X |
| 2,133,361 | 10/1938 | Reeves | 73/368.7 X |
| 2,507,911 | 5/1950 | Keller | 73/368.7 X |
| 3,721,125 | 3/1973 | Kugler et al. | 73/368.3 |

Primary Examiner—Charles Gorenstein
Attorney, Agent, or Firm—Larson, Taylor & Hinds

[57] ABSTRACT

Temperature dependent actuating mechanism comprising a temperature responsive sensor including a variable volume chamber in fluid communication with a chamber in an actuator containing a variable volume member connected with an operating member; the sensor further including temperature responsive means change in volume of which brought about by a rise in temperature increases the interior volume of said variable volume chamber to permit fluid to flow out of said actuator chamber and the volume of said variable volume member to increase with resultant movement of the operating member.

13 Claims, 7 Drawing Figures

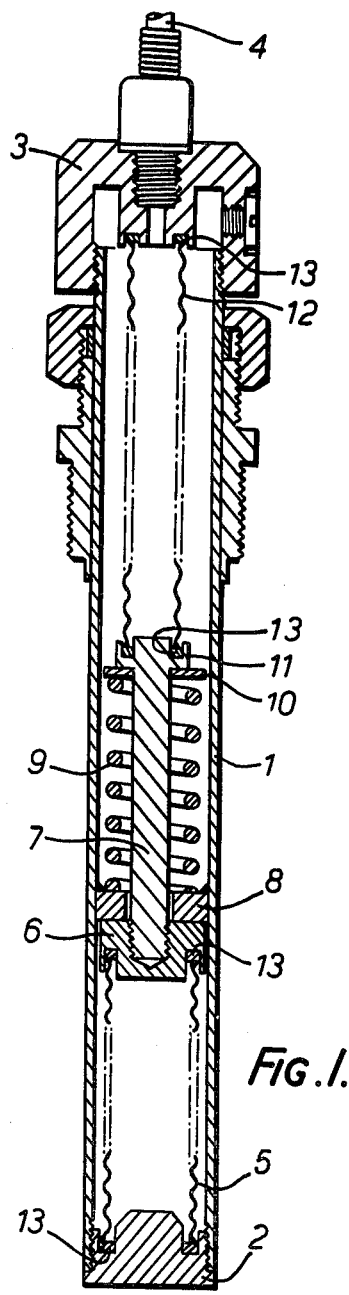
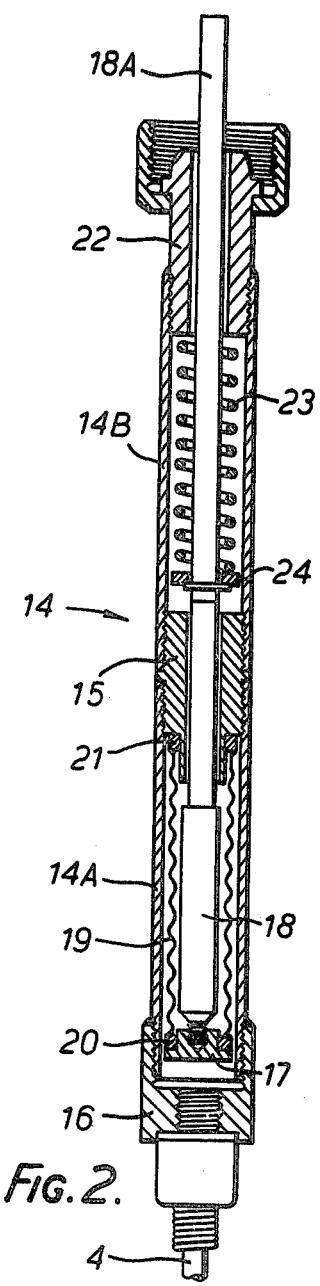
FIG.1.
FIG.2.

A CONTROL SYSTEM / NORMALLY CLOSED VALVE.
VALVE CLOSES WITH RISE IN TEMPERATURE.

B CONTROL SYSTEM / NORMALLY OPEN VALVE.
VALVE OPENS WITH RISE IN TEMPERATURE.

C CONTROL SYSTEM / NORMALLY OPEN VALVE.
WITH HIGH LIMIT CUT-OUT.
VALVE CLOSES AT PRE SET HIGH TEMPERATURE.

TEMPERATURE-DEPENDENT ACTUATING MECHANISMS

This invention relates to temperature dependent actuating mechanisms for use, for example, for controlling a valve in dependence upon the temperature of fluid flowing in a pipe line under control of the valve. Such mechanisms are known in which an actuator for operating a valve is connected by a capillary tube to a sensor that is placed in the fluid, the sensor containing oil that passes along the capillary tube to motivate the actuator when expansion of the oil takes place as a result of rise in fluid temperature. The actuator can be used to motivate a normally open valve (that is a valve for which the actuator has to act against biasing forces to close the valve) for example to cause the valve to cut-off a fulid flow if the temperature of the fluid flowing rises above a predetermined amount. A difficulty here is that the system as a whole does not "fail safe" if loss of oil from the actuating mechanism occurs because, for example, the capillary tube is accidentally severed, since in these conditions the valve being controlled will open even though closure may be called for. Likewise, if the actuator is used to motivate a normally closed valve (for which the actuator has to act against biasing forces to open the valve) the system as a whole does not "fail safe" if the valve is being used to supply cooling medium and the actuating mechanism fails at a time when such a supply is required and the valve should therefore be open.

According to the present invention there is provided a temperature dependent actuating mechanism comprising a temperature responsive sensor that includes a variable volume chamber the interior of which is in fluid communication with a chamber in an actuator, this actuator chamber containing a variable volume member that is connected with an operating member of the acutator to move this operating member in dependence upon changes in volume of the variable volume member; the sensor further including a temperature responsive means connected with said variable volume chamber such that change in volume of said means brought about by rise in temperature increases the volume of the interior of said variable volume chamber, thereby to permit fluid to flow out of said actuator chamber and the volume of said variable volume member to increase with resultant movement of the operating member. In such a construction if a force such as a spring force is applied to the variable volume member of the actuator to bias it always to tend to adopt its maximum volume then in the event of loss of fluid from the variable volume sensor chamber/actuator chamber the actuator operating member adopt the position which it adopts in normal operation when the sensor is subjected to the maximum temperature that it is intended to operate at. In other words, the system as a whole will "fail safe" in the event of loss of this fluid in the sense that the system will adopt a condition corresponding to maximum temperature at the sensor, whereas in the known systems referred to above such loss of fluid results in the system adopting a condition corresponding to minimum temperature at the sensor.

Figure 5A:
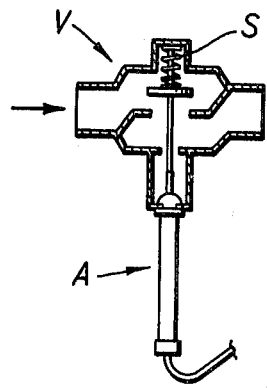
Figure 5B:
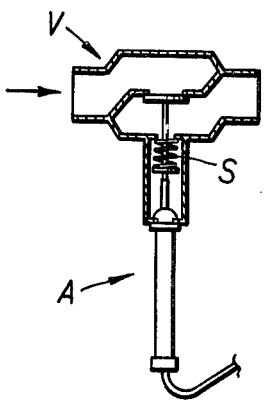
Figure 5C:
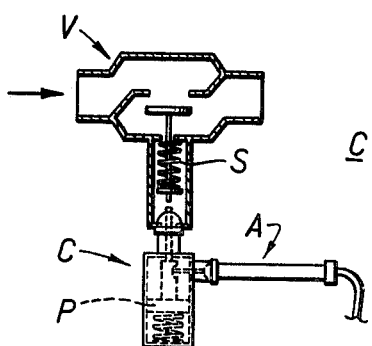

For a better understanding of the invention and to show how the same may be carried into effect, reference will now be made, by way of example, to the drawings accompanying this Specification, in which:

FIG. 1 is a sectional side view of a sensor of a temperature dependent actuating mechanism, FIG. 2 is a sectional side view of an actuator of the mechanism, FIG. 3 is a view similar to FIG. 1 of a second form of sensor, FIG. 4 is a sectional side view of part of a third form of sensor, and FIGS. 5A, 5B and 5C diagrammatically illustrate operation of the mechanism with alternative forms of valve.

The sensor of FIG. 1 has a hollow cylindrical body 1 closed in fluid-tight manner at one end by a plug 2 and at the other end by a cap 3 to which is attached one end of a capillary tube 4 that is a small-bore, flexible tube of, for example, copper. In the direction from the plug 2 to the cap 3 there is within the body 1 a variable volume chamber in the form of a metal bellows 5 fast at one end with the plug 2; a shouldered member 6 carried at one end of a tie rod 7 and with which the other end of the bellows 5 is fast; a wall 8 fast with the body 1 and slidably supporting the tie rod 7; a compression spring 9 acting between the wall 8 and a washer 10 retained on the tie rod 7 by a shouldered portion 11 of the tie rod; and a further variable volume chamber in the form of a bellows 12 fast at one end with the tie rod shouldered portion 11 and at the other end with the cap 3. The interior of the body 1 is filled with oil (which for convenience will hereinafter be referred to as sensor oil) so that, in particular, each of the bellows is immersed in this oil, the ends of the bellows being made fast with the components 2, 6, 11 and 3 via rings of solder 13 in fluid-tight manner so that the interiors of the bellows are sealed from the sensor oil. The interior of the bellows 12 is open to the bore of the capillary tube 4. The bellows 5 is of larger effective area than the bellows 12.

The actuator of FIG. 2 has a hollow cylindrical body 14 formed in two parts 14A, 14B interconnected by a connector 15. The body 14 is closed in fluid-tight manner at one end by a cap 16 to which is attached the other end of the capillary tube 4, the bore of this tube opening through the cap to the interior of the body portion 14A. In the direction from the cap 16 to the connector 15 there is within the body portion 14A a shouldered member 17 carried by one end of an operating member in the form of a push rod 18, and a variable volume member in the form of a metal bellows 19 that is fast in fluid-tight manner at one end via a ring of solder 20 with the shouldered member 17 and at the other end via a ring of solder 21 with the connector 15. The push rod 18 extends through the connector 15 (in which it is slidably supported), the body portion 14B and a plug 22 at the end of the body portion 14B remote from the connector 15, the push rod 18 terminating in a portion 18A that projects from the plug 22. Within the body portion 14B there is a compression spring 23 acting between the plug 22 and a washer 24 on the push rod 18.

The bellows 19 is immersed in oil (which for convenience will hereinafter be referred to as transfer oil) that fills the body portion 14A, the capillary tube 4 and the interior of the bellows 12 of the sensor, this oil being prevented from leaking from the actuator body portion 14A by the fluid-tight fastening of the bellows 19 to the components 15 and 17.

The sensor and actuator are illustrated in FIGS. 1 and 2 in a sensor oil cold condition, that is the volume of the sensor oil is at a minimum value. It is to be noted that the push rod 18 of the actuator is in an extended position. If the sensor is heated the sensor oil expands and exerts pressure on the sensor bellows 5 and 12. Because the sensor bellows differ in effective area an out-of-balance force occurs which tends to compress the larger bellows 5, simultaneously extending the smaller bellows 12, against the action of the spring 9. The greater the rise in temperature, the greater is this effect. The extension of the smaller bellows 12 draws transfer oil back through the capillary tube 4 into the bellows 12 and thereby the volume of transfer oil in the actuator is reduced, permitting the actuator bellows 19 to extend under the action of the spring 23. The push rod 18 is thus caused to retract into the actuator. Upon subsequent fall in temperature, the sensor oil volume drops, the volume of the sensor bellows 5 increases and the volume of the sensor bellows 12 reduces under the action of the spring 9, and the transfer oil is returned to the actuator so that the volume of the actuator bellows is reduced and the push rod 18 is driven in the direction out of the actuator body.

The spring 9 can be omitted if the bellows 5 is filled with gas at a pressure sufficient to bias the bellows towards its maximum volume condition, the bellows acting in this case as a gas spring.

it is to be noted that if the transfer oil is lost, for example because the capillary tube is fractured, the actuator push rod will adopt its retracted position, that is the position which it adopts in normal operation when the sensor is subjected to the maximum temperature that it is intended to operate at. This is, however, not the case if the sensor oil is lost and if it is desired to provide for this possibility the second form of sensor illustrated in FIG. 3 can be utilized. In this form the temperature responsive means that expands with rise in temperature and that is constituted by the sensor oil and the bellows 5 is omitted and in its place there is provided a block 25 of semi-solid expansible medium such as gutta-percha (gummi plasticum) that serves as a temperature responsive means that expands with rise in temperature. Gutta-percha is represented by the formula $(C_{10}H_{16})_2$ and is defined in Hackh's Chemical Dictionary as the "purified, coagulated milky exudate of *Palaquium* species (*sapotaceae*). Yellow masses, sticks or sheets, with red streaks, insoluble in water, partly soluble in turpentine oil. It contains fluavil alban, and a volatile oil; softens at 65°. The tie rod 7 passes through the block 25 which is contained between the wall 8 and an abutment member 6A at the end of the tie rod 7. Between the abutment member 6A and a plug 2A closing the adjacent end of the body 1 there is a compression spring 9A. The member 6A, plug 2A and spring 9A replace the member 6, plug 2 and spring 9 of the actuator of FIG. 1.

When, in use, the sensor of FIG. 3 is subjected to a rise in temperature, the expansion of the block 25 that occurs causes the bellows 12 to expand in the way already described.

Either of the forms of sensor so far described can have incorporated a facility for adjusting the temperature operating range, as illustrated in FIG. 4. The cap 3 is replaced by a connector 3A on which is mounted an adjustor 26. This adjustor includes a chamber 27 through which the interior of the sensor bellows 12 is placed in communication (via a bore 28 through the connector 3A) with the bore of the capillary tube 4, the capillary tube 4 in this case being attached to the adjustor 26. Within the chamber 27 there is a bellows 29 one end of which is fast in fluid-tight manner, via a ring of solder 30 with a shoulder member 31 carried by a rod 32 that extends through the bellows 29. The other end of the bellows 29 is fast in fluid-tight manner, via a ring of solder 33, with a wall portion of the adjacent body 26. Thus the interior of the bellows 29 is sealed from the transfer oil in the chamber 27.

At its end remote from the shoulder member 31 the rod 32 is fast with an adjacent knob 34 threadingly engaged with the body 26 such that rotation of the knob brings about axial movement thereof and of the rod 32 thereby to expand or compress the bellows 29. Alteration of the volume of the variable volume chamber that is constituted by the bellows 29 alters the volume of the chamber 27 available for the transfer oil and this change in the effective volume of the transfer oil alters the temperature operating range of the sensor.

Use of temperature-dependent actuating mechanisms as described above with reference to FIGS. 1 to 4 to control valves is diagrammatically illustrated in FIGS. 5A, 5B and 5C. In each of these Figures the actuator of the mechanism is identified by the letter A and the valve by the letter V and it is to be noted that each valve is provided with a valve spring S in conventional fashion. It is to be noted that the actuator spring 23 that has been described can be omitted where the action of the valve spring S will satisfactorily replace the action of the spring 23.

FIG. 5A illustrates the actuating mechansim used where it is desired that a rise in temperature at the sensor should result in closure of the valve. The valve used is a normally closed valve, the actuator acting against the action of the valve spring to hold the valve open until the actuator is motivated by a rise in temperature at the sensor. Loss of transfer oil will also result in closure of the valve, that is the system as a whole will "fail safe".

FIG. 5B illustrates the actuating mechanism used where it is desired that a rise in temperature at the sensor should result in opening of the valve (for example where cooling medium is to be supplied by opening of the valve to counteract a temperature rise). The valve used is a normally open valve, the actuator acting against the action of the valve spring to hold the valve closed until the actuator is motivated by a rise in temperature at the sensor. Loss of transfer oil will also result in opening of the valve so that in this case also the system as a whole will "fail safe".

FIG. 5C illustrates the actuating mechanism used to control a high limit cut-out C of a normally open valve. The cut-out has a spring-loaded plunger P and the actuator is connected to the cut-out so as normally to hold this plunger in a withdrawn position (illustrated) in which the valve is open. Withdrawal of the actuator push rod brought about by motivation of the sensor frees the cut-out plunger, the cut-out spring asserts itself, and the plunger moves to overcome the action of the valve spring and close the valve. This system also "fails safe" in the event of loss of transfer oil as the plunger will be freed to close the valve if such oil loss occurs.

A normally closed valve may similarly be used with the actuating mechanism and high limit device. Actuation of the cut-out device brought about by a high temperature would in this instance open the valve, for example, to allow cooling medium to be supplied to counteract the temperature rise. This system would also "fail safe" in the event of loss of transfer oil.

I claim:

1. A temperature dependent actuating mechanism comprising a temperature responsive sensor and an actuator;
   the sensor including:
   a variable volume chamber,
   a temperature responsive means, and
   a connection between said variable volume chamber and said temperature responsive means such that change in volume of said means brought about by rise in temperature increases the volume of the interior of said variable volume chamber;
   the actuator including:
   a chamber,
   a variable volume member in this actuator chamber, and
   an operating member connected with said variable volume member to move in dependence upon changes in volume of the variable volume member; and
   the mechanism further comprising a fluid flow path between the interior of said variable volume chamber of the sensor and said chamber of the actuator whereby increase in the volume of the interior of said variable volume chamber of the sensor permits fluid to flow out of said actuator chamber via said fluid flow path thereby to permit the volume of said variable volume member of the actuator to increase with resultant movement of the operating member of the actuator.

2. Mechanism according to claim 1 and further comprising means biassing said variable volume chamber of the sensor to adopt its minimum volume.

3. Mechanism according to claim 1 and further comprising means biassing said variable volume member of the actuator to tend always to adopt its maximum volume.

4. Mechanism according to claim 2, wherein the biassing means includes a spring.

5. Mechanism according to claim 3, wherein the biassing means includes a spring.

6. Mechanism according to claim 1, wherein said variable volume chamber of the sensor is a first bellows;
   wherein said fluid flow path is via a capillary tube; and
   wherein said temperature responsive means of the sensor includes a second bellows immersed in temperature responsive fluid contained in the sensor, the interior of this second bellows being sealed from this fluid;
   there being a connection between the second bellows and the first bellows such that extension or contraction of the second bellows is accompanied by extension or contraction of the first bellows.

7. Mechanism according to claim 6, wherein the first bellows is also immersed in said fluid with its interior sealed therefrom; and
   wherein the second bellows is of larger effective area than the first bellows.

8. Mechanism according to claim 6, wherein the second bellows is filled with gas at a pressure sufficient to bias this bellows towards its maximum volume condition whereby this bellows acts as a gas spring biassing the first bellows to adopt its minimum volume.

9. Mechanism according to claim 1, wherein said variable volume chamber of the sensor is a bellows;
   wherein said fluid flow path is via a capillary tube; and
   wherein said temperature responsive means of the sensor includes a block of semi-solid temperature responsive expansible medium;
   there being a connection between said block and said bellows such that extension or contraction of the block is accompanied by extension or contraction of the bellows.

10. Mechanism according to claim 9, wherein said block is of Gutta-Percha.

11. Mechanism according to claim 1, wherein said variable volume member in said chamber of the actuator is a bellows.

12. Mechanism according to claim 1 and further comprising, in said fluid flow path, a further chamber of adjustable volume,
    and means for setting the volume of this further chamber to any desired value within a predetermined range.

13. Mechanism according to claim 12, wherein said further chamber is a bellows that can be expanded or compressed to adjust its volume.

* * * * *